United States Patent
Donaghey

(10) Patent No.: US 7,106,747 B2
(45) Date of Patent: Sep. 12, 2006

(54) SYSTEMS AND METHODS FOR IMPLEMENTING SECOND-LINK ROUTING IN PACKET SWITCHED NETWORKS

(75) Inventor: Robert J. Donaghey, Lexington, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 910 days.

(21) Appl. No.: 09/726,056

(22) Filed: Nov. 30, 2000

(65) Prior Publication Data

US 2001/0030972 A1   Oct. 18, 2001

(51) Int. Cl.
*H04L 12/56* (2006.01)

(52) U.S. Cl. .............. 370/395.52; 370/392; 370/397; 370/399; 370/349

(58) Field of Classification Search .......... 370/389, 370/392, 397, 395.1, 401, 400, 409, 466, 370/395.2, 395.3, 395.31, 465, 471, 496, 370/395.52, 349, 399; 709/238
See application file for complete search history.

(56) References Cited

U.S. PATENT DOCUMENTS

| | | | |
|---|---|---|---|
| 5,463,621 A * | 10/1995 | Suzuki | 370/399 |
| 5,467,349 A * | 11/1995 | Huey et al. | 370/397 |
| 5,822,304 A | 10/1998 | Brody et al. | |
| 5,822,309 A | 10/1998 | Ayanoglu et al. | |
| 5,933,425 A | 8/1999 | Iwata | |
| 6,108,708 A * | 8/2000 | Iwata | 709/238 |
| 6,122,282 A | 9/2000 | Chng | |
| 6,147,994 A * | 11/2000 | Duree et al. | 370/392 |
| 6,178,169 B1 * | 1/2001 | Hodgkinson et al. | 370/395.52 |
| 6,222,845 B1 | 4/2001 | Shue et al. | |
| 6,275,494 B1 * | 8/2001 | Endo et al. | 370/395.52 |
| 6,301,257 B1 | 10/2001 | Johnson et al. | |
| 6,304,556 B1 | 10/2001 | Haas | |
| 6,347,078 B1 | 2/2002 | Narvaez-Guarnieri et al. | |
| 6,563,833 B1 | 5/2003 | Wool et al. | |
| 6,587,467 B1 | 7/2003 | Morgenstern et al. | |
| 6,683,865 B1 * | 1/2004 | Garcia-Luna-Aceves et al. | 370/349 |
| 2003/0133406 A1 | 7/2003 | Fawaz et al. | |

* cited by examiner

*Primary Examiner*—Hassan Kizou
*Assistant Examiner*—Albert T. Chou
(74) *Attorney, Agent, or Firm*—Faegre & Benson LLP

(57) ABSTRACT

A network (100) includes multiple gateways (135, 140) and a router (105) connected to at least one of the multiple gateways (135, 140). The router (105) is configured to receive packets that include multiple first virtual circuit identifiers associated with the multiple gateways in the network (100), assign second virtual circuit identifiers to the at least one connected gateway, and initiate transmission of a message to the at least one connected gateway informing the gateway of the first virtual circuit identifiers.

20 Claims, 10 Drawing Sheets

SWITCH'S VC TABLE FOR PACKETS FROM GATEWAY

400

| VC ENTRY 405 | ROUTER OUTPUT PORT ($PN_{OUT}$) 410 | $VCI_{out}$ 415 | DESTINATION |
|---|---|---|---|
| 1 | IP ROUTER | HELLO # | ROUTER |
| 2 | IP ROUTER | ROUTE # | ROUTER |
| 3 | IP ROUTER | IP # | ROUTER DECISION |
| 4 | Port 2 | 171 | GATEWAY G |
| 5 | Port 0 | 34 | GATEWAY W |
| 6 | Port 3 | 72 | GATEWAY K |
| 7 | IP ROUTER | IP # | ROUTER DECISION |
| 8 | Port 1 | 49 | GATEWAY B |

FIG. 4

GATEWAY'S VC TABLE FOR PACKETS FROM ROUTER

500

| VC ENTRY 505 | DESTINATION 510 |
|---|---|
| HELLO # | GATEWAY PROCESSOR |
| ROUTE # | GATEWAY PROCESSOR |
| IP # | FORWARD TO LAN, WITHOUT VCI |

FIG. 5

GATEWAY FORWARDING TABLE

600

| DESTINATION GATEWAY 605 | $VCI_{out}$ 610 |
|---|---|
| GATEWAY G | 171 |
| GATEWAY W | 34 |
| GATEWAY K | 72 |
| GATEWAY Z | 116 |
| GATEWAY B | 49 |

FIG. 6

ROUTER-TO-ADJACENT-ROUTER UPDATE

700

| ROUTER # 705 | ROUTER_B |
|---|---|
| SEQ. # 710 | SEQ_NUM |
| GATEWAY STATE (UP/DOWN) 715 | GATEWAY VCI 720 |

FIG. 7

800  ROUTER-TO-ROUTER GATEWAY-FLOOD-UPDATE

| ROUTER# 805 | ROUTER_B | |
|---|---|---|
| SEQ. # 810 | SEQ_NUM | |
| GATEWAY G 815 | GATEWAY DATA 820 | |
| GATEWAY W 815 | GATEWAY DATA 820 | |
| GATEWAY K 815 | GATEWAY DATA 820 | |
| GATEWAY B 815 | GATEWAY DATA 820 | |
| | | |

FIG. 8

900  ROUTER-TO-GATEWAY UPDATE

| SEQ. # 905 | SEQ_NUM | |
|---|---|---|
| GATEWAY 910 | GATEWAY VCI 915 | ADD/DROP FLAG 920 |
| GATEWAY K | 72 | ADD |
| GATEWAY Z | 116 | DROP |
| GATEWAY B | 49 | ADD |
| | | |

FIG. 9

SYSTEMS AND METHODS FOR IMPLEMENTING SECOND-LINK ROUTING IN PACKET SWITCHED NETWORKS

FIELD OF THE INVENTION

The present invention relates generally to packet switching systems and methods and, more particularly, to systems and methods for routing Internet Protocol (IP) traffic between local-area networks (LANs) connected via connection-oriented packet switches in mobile ad-hoc networks using virtual circuits.

BACKGROUND OF THE INVENTION

Connection-oriented protocols have conventionally been used for switching packets from a source node to a destination node in packet switching networks. Such protocols have found acceptance in the mobile arena with network hardware installed in trucks and other vehicles or hand-carried. Connections between switches in such environments are often short-lived as equipment is moved together or apart, and are of widely fluctuating throughput quality. The challenge of routing data packets in this environment is substantially greater than that of stationary systems. Connection-oriented designs for such systems have been favored because of the need to support telephony as well as machine-to-machine communications. However, IP has become the protocol of choice for end users of such systems, so the need to route IP packets across mobile, ad hoc switching networks has been met by adding IP routers on top of the connection-oriented switches, and developing protocols for establishing the optimal path from one router to another.

The algorithms used by routers to convey connectivity in a mobile network have evolved to keep up with the constantly changing topology, and, as the IP addresses themselves will not convey any topological information when a router can move about freely, they typically use flooding techniques (sometimes called 'Shortest Path First' algorithms) to pass local connectivity information on to more distantly-connected routers. A router then uses this information when sending or forwarding packets to another router to decide which way to send the packet. Typically a router will determine which of its nearest neighbors is 'closest' to the destination, and then forwards the packet one hop to the chosen neighbor. To do so when the router is attached to a connection-oriented switch, as is the case here, the router must select a virtual circuit on which to place the packet. To facilitate this, it is the current practice for each switch to automatically set up a permanent one-hop circuit to each of its immediate neighbors, with the neighbor forwarding all packets arriving on this circuit to its connected IP router.

When workstations on LANs are attached to a network switch, it is the current practice for whatever device is used to bridge between the LAN and the switch (technically a gateway) to employ the same technique of forwarding all packets addressed 'off LAN' to the same one-hop circuit to be forwarded to the IP-router, where the knowledge of the current network topology resides.

The use of multi-hop circuits for faster IP packet transport has faced a number of substantial obstacles: Portable equipment lags the stationary world in terms of size and speed, and mobile switch equipment usually has sufficient memory only for small Virtual Circuit (VC) tables. Hence, circuits have to be used selectively. The paths between switches are in constant flux in a fast moving mobile environment (as, for example, in military or fire-fighting environments), so connections are constantly being broken and re-established. IP is not connection-oriented, so setting up connections as packets arrive for some new destination has proved infeasible since the standard protocols for negotiating a virtual circuit across multiple hops take substantially longer than TCP timeouts tolerate. Knowledge of breaks in connectivity is known first to the switches closest to the break, so packets forwarded by more distant routers will often arrive with the expectation of a (now-broken) path to the destination, and the receiving router must be able to acquire control of the packet, rather than have its connected switch forward the packet further down a no-longer-complete virtual circuit.

For traffic between workstations on different LANs attached by gateways to different switches (in trucks, etc.), the problem is even more difficult since the gateway device bridging between the LAN and a router/switch has no knowledge of the network topology. Nevertheless, fast communications is a must between workstations in ad hoc networks, and there is a real need for better use of the capabilities of the underlying connection-oriented switching network for these communications.

Therefore, there exists a need for a system and method that can implement multi-hop virtual circuit paths in a mobile, ad hoc, connection-oriented packet switching network to support fast and reliable connectivity of connected LANs.

SUMMARY OF THE INVENTION

Systems and methods, consistent with the present invention, address this and other needs by assigning virtual circuit identifiers (VCIs) to LAN gateways and distributing the VCIs to other LAN gateways throughout a network. Distribution of these VCIs permits each receiving LAN gateway to implement virtual circuit paths with other LAN gateways in the network.

In accordance with the purpose of the invention as embodied and broadly described herein, a method of distributing virtual circuit identifiers associated with gateways in a network includes receiving, at a first node, packets comprising a plurality of first virtual circuit identifiers associated with gateways in the network; determining if any of the gateways are connected to the first node; assigning second virtual circuit identifiers to the connected gateways; and initiating the transmission of a message to the connected gateways informing the connected gateways of the plurality of first virtual circuit identifiers.

In another implementation consistent with the present invention, a method of forwarding packets received at a first gateway in a network includes receiving a message at the first gateway, the message comprising a plurality of virtual circuit identifiers associated with other gateways in the network; receiving packets for transmission from the first gateway to a destination address associated with a second gateway; and sending the received packets towards the second gateway using one of the received plurality of virtual circuit identifiers.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 is an exemplary Switch Virtual Circuit (VC) table for a switch-gateway interface 250 consistent with the present invention;

FIG. 5 is an exemplary gateway VC table for the switch port consistent with the present invention;

FIG. 6 is an exemplary gateway forwarding table consistent with the present invention;

FIG. 7 is an exemplary router-to-adjacent-router update packet consistent with the present invention;

FIG. 8 is an exemplary router-to-router gateway-flood-update packet consistent with the present invention;

FIG. 9 is an exemplary router-to-gateway update packet consistent with the present invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms that assign VCIs to LAN gateways and distribute the VCIs to other LAN gateways throughout a network. Distribution of these VCIs permits each receiving LAN gateway to implement virtual circuit paths with other LAN gateways in the network.

EXEMPLARY NETWORK

Figure 1:
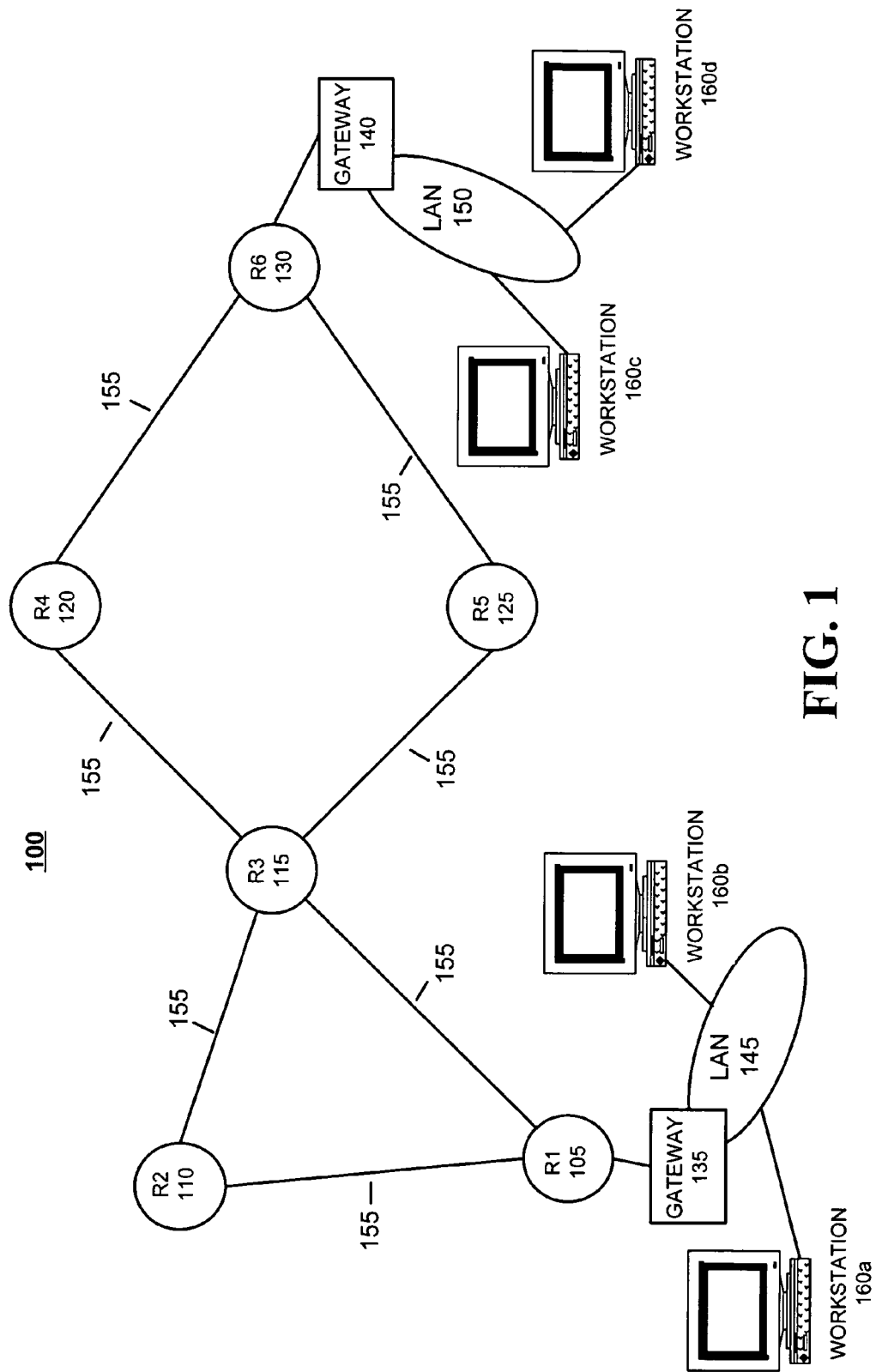
FIG. 1 illustrates an exemplary network in which systems and methods, consistent with the present invention, may be implemented.

FIG. 1 illustrates an exemplary network 100 in which systems and methods, consistent with the present invention, may be implemented. Network 100 may include multiple routers, each router interconnected with another router by conventional links. For purposes of illustration, FIG. 1 shows router/switches R1 105, R2 110, R3 115, R4 120, R5 125 and R6 130 interconnected by links 155. One skilled in the art will recognize that a typical network may include fewer or greater numbers of routers than those shown in FIG. 1.

Network 100 may further include gateways interconnected with one or more of the routers of the network. For purposes of illustration, FIG. 1 shows gateways 135 and 140 connected with routers R1 105 and R6 130, respectively. Each gateway may further connect with a local-area network (LAN). For example, gateways 135 and 140 may connect to LANs 145 and 150, respectively. LANs 145 and 150 may include one or more networks using any type of multi-access media, including, for example, an Ethernet or a token ring network. One or more conventional workstations, such as workstations 160a–160d, may further interconnect with each LAN.

EXEMPLARY ROUTER

Figure 2:
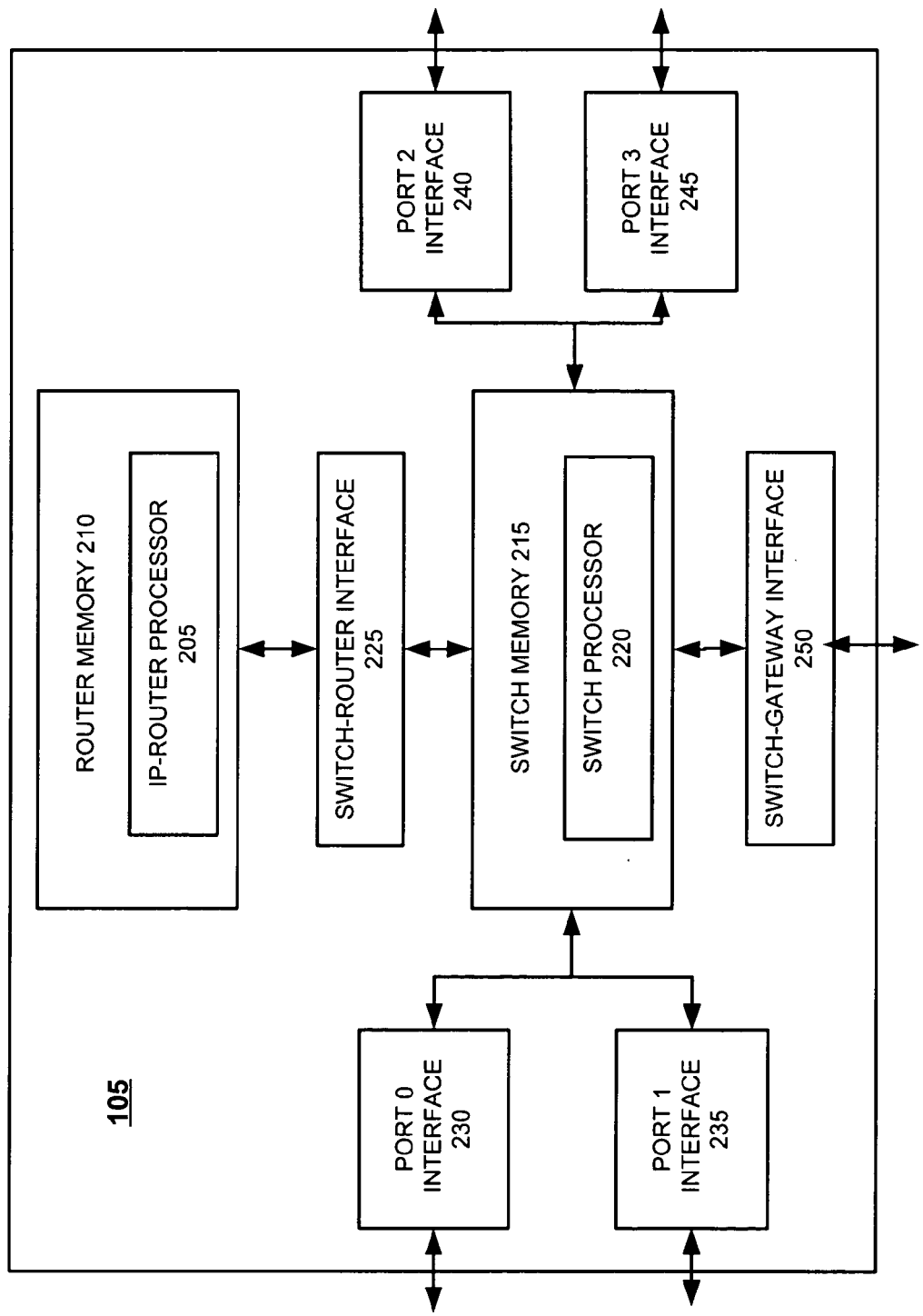
FIG. 2 illustrates exemplary components of a Router/Switch consistent with the present invention.

FIG. 2 illustrates an exemplary router/switch R1 105 that may route packets in a manner consistent with the present invention. Router/switches 110–130 may be similarly configured. Router/switch R1 105 may include an IP-router processor 205, a router memory 210, a switch memory 215, a switch processor 220, a switch-router interface 225, port interfaces 230, 235, 240 and 245, and switch-gateway interface 250.

IP-router processor 205 may execute instructions for performing IP routing algorithms and can include a conventional processing device. Switch processor 220 may execute instructions for performing, among other functions, virtual circuit path switching and can include a conventional processing device. Router memory 210 may provide permanent, semi-permanent, or temporary working storage of data and instructions for use by IP-router processor 205. Switch memory 215 may provide permanent, semi-permanent, or temporary working storage of data and instructions for use by switch processor 220. Router memory 210 and switch memory 215 may include conventional data storage devices, such as, for example, Random Access Memory (RAM) or Dynamic RAM (DRAM).

Switch-router interface 225 may include conventional mechanisms for interfacing IP-router processor 205 with switch processor 220. Port 0 interface 230, port 1 interface 235, port 2 interface 240 and port 3 interface 245 may each include conventional mechanisms for interfacing router 105 with network 100 via links 155. Switch-gateway interface 250 may include conventional mechanisms for interfacing router 105 with one or more gateways, such as gateway 135.

EXEMPLARY GATEWAY

Figure 3:
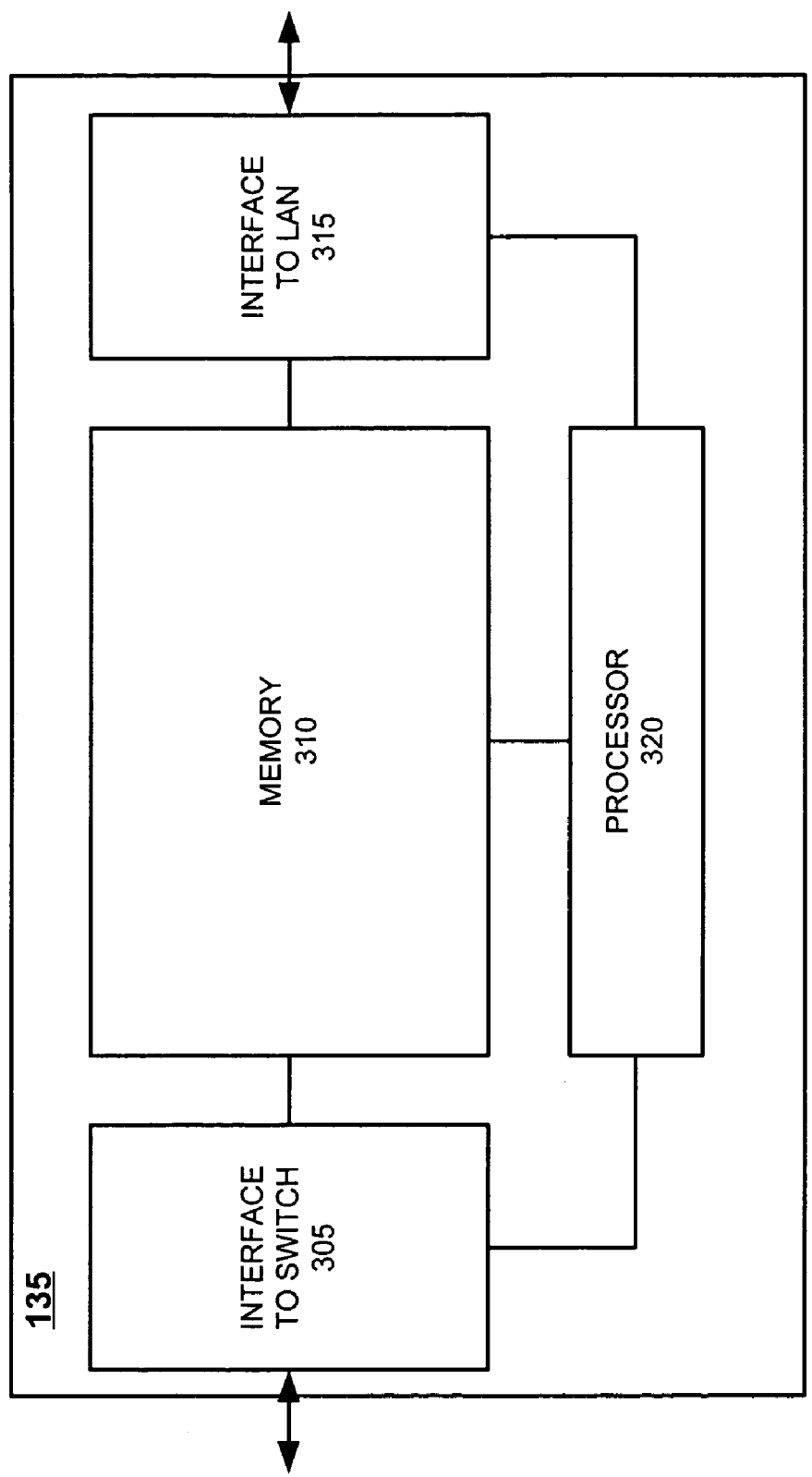
FIG. 3 illustrates exemplary components of a gateway consistent with the present invention.

FIG. 3 illustrates an exemplary gateway 135 that may receive and forward IP packets to and from LAN 145 consistent with the present invention. Gateway 140 may be similarly configured. Gateway 135 may include a switch interface 305, a memory 310, a LAN interface 315 and a processor 320.

Switch interface 305 may include conventional mechanisms for interfacing gateway 135 with a packet-switch, such as router/switch 105. Memory 310 may provide permanent, semi-permanent, or temporary working storage of data and instructions for use by processor 320. Memory 310 may include conventional data storage devices, such as, for example, RAM or DRAM. LAN interface 315 may include conventional mechanisms for interfacing gateway 135 with a LAN, such as LAN 145. Processor 320 may execute instructions for forwarding packets to and from a connected switch or a connected LAN in a manner consistent with the present invention. Processor 320 may include a conventional processing device.

EXEMPLARY ROUTER VC TABLE

FIG. 4 illustrates an exemplary switch Virtual Circuit (VC) table 400, consistent with the present invention, that may be stored in switch memory 215 for the switch-gateway interface 250 of router/switch 105. Switch VC table 400 may include VC entries 405 containing a switch output port ($PN_{out}$) 410 and an outgoing virtual circuit identifier ($VCI_{out}$) 415. Switch VC entries 405 may correspond to incoming VCIs contained in received packet headers. A Switch VC entry 405 may include a switch output port ($PN_{out}$) 410 through which to forward a packet, and it may also include an outgoing virtual circuit identifier ($VCI_{out}$) 415 that is to be placed in an outgoing packet header in place of an incoming VCI ($VCI_{in}$).

EXEMPLARY GATEWAY VC TABLE

FIG. 5 illustrates an exemplary gateway VC table 500, consistent with the present invention, that may be stored in memory 310 of each gateway in network 100. VC table 500 may include VC entries 505 containing a destination 510. VC destinations 510 may include the gateway processor and the LAN. VC entries 505 may exist for 'Hello' protocol messages, 'Route' protocol messages, and packets intended for the LAN. For example, entry one might be designated as the 'Hello' protocol entry number, entry two might be designated as the 'Route' protocol number, and three might be designated as the entry number for all packets intended for a workstation connected to a gateway LAN, such as LAN 145.

EXEMPLARY GATEWAY FORWARDING TABLE

FIG. 6 illustrates an exemplary gateway forwarding table 600, consistent with the present invention, that may be stored in memory 210 of each router in network 100, such as router R1 105, and in memory 310 of each gateway in network 100. Forwarding table 600 may include destination gateway entries 605 and outgoing virtual circuit identifier entries ($VCI_{out}$) 610. Destination gateway entries 605 may include entries indicating destination gateways in network 100 that the gateway storing forwarding table 600 may be able to reach. $VCI_{out}$ entries 610 may include outgoing virtual circuit identifiers that correspond to each destination gateway 605. $VCI_{out}$ entries 610 for different destination gateways may or may not be distinct, depending on the connected router's decision logic and its understanding of the network topology.

EXEMPLARY ROUTER-TO-ADJACENT ROUTER UPDATE PACKET

FIG. 7 illustrates an exemplary packet 700, consistent with the present invention, that may be used by a router in network 100, such as router R1 105, to inform neighboring routers of gateways connected to router R1 105. Packet 700 may include a router number 705, a sequence number 710, gateway state data 715, and gateway VCI data 720.

Router number 705 may include a number that identifies the router sending the update packet. Sequence number 710 may provide an indication of the version of packet 700 sent from the router identified by router number 705. For example, older versions of a packet sent from router 105 may have lower sequence numbers than newer versions of the tag update packet. Gateway state data 715 may include data indicating whether gateways connected to router 105 are operational or non-operational. Gateway VCI data 720 may include data identifying the VCI(s) assigned by router 105 to gateways connected to router 105. Gateway VCI data 720 may be used by another router in the network to fashion a virtual circuit whose last two links are into some port of the router's switch, and then out of the switch toward the gateway. To this end, the router may set the VC Table entry assigned for the gateway to have $Pn_{out}$=SWITCH-GATEWAY INTERFACE 250 and $VCI_{out}$=IP #, the entry number for all packets intended for a workstation connected to the gateway LAN. This allows the other router to form a virtual circuit terminating at this router's gateway for use in fast switching the other router's gateway's packets to this gateway.

EXEMPLARY ROUTER FLOOD UPDATE PACKET

FIG. 8 illustrates an exemplary packet 800, consistent with the present invention, that may be used by a router in network 100, such as router R1 105, to inform other routers in the network of gateways in network 100. Packet 600 may include a router number 805, a sequence number 810, gateway identifiers 815, and gateway data 820.

Router number 805 may include a number identifying the router sending the packet. Sequence number 810 may provide an indication of the version of packet 800 sent from the router identified by router number 805. For example, older versions of a packet sent from router 105 may have lower sequence numbers than newer versions of the tag update packet. Gateway identifiers 815 may identify addresses associated with gateways in network 100. Gateway data 820 may indicate up/down state, characteristics, IP address ranges, or any other information that the routers find useful.

EXEMPLARY ROUTER-TO-GATEWAY UPDATE PACKET

FIG. 9 illustrates an exemplary packet 900, consistent with the present invention, that may be used by a router in network 100, such as router R1 105, to inform a connected gateway of VCIs assigned to other gateways in network 100, so that the gateway may keep its gateway forwarding table 600 consistent with the router's. Packet 900 may include a sequence number 905, gateway identifiers 910, gateway VCIs 915 and add/drop flags 920.

Sequence number 905 may provide an indication of the version of packet 900 sent from the router connected to a gateway. Gateway identifiers 910 may include addresses associated with gateways in network 100. For example, older versions of a packet sent from router 105 may have lower sequence numbers than newer versions of the update packet. Gateway VCIs 915 may include VCIs for each connected gateway to use to reach gateways identified by gateway identifiers 910. Add/drop flag 920 may include status indicators that indicate whether gateways identified by gateway identifiers 910 should be added to or removed from gateway forwarding table 600.

EXEMPLARY ROUTER VC TABLE UPDATE PROCESSING

Figure 10:
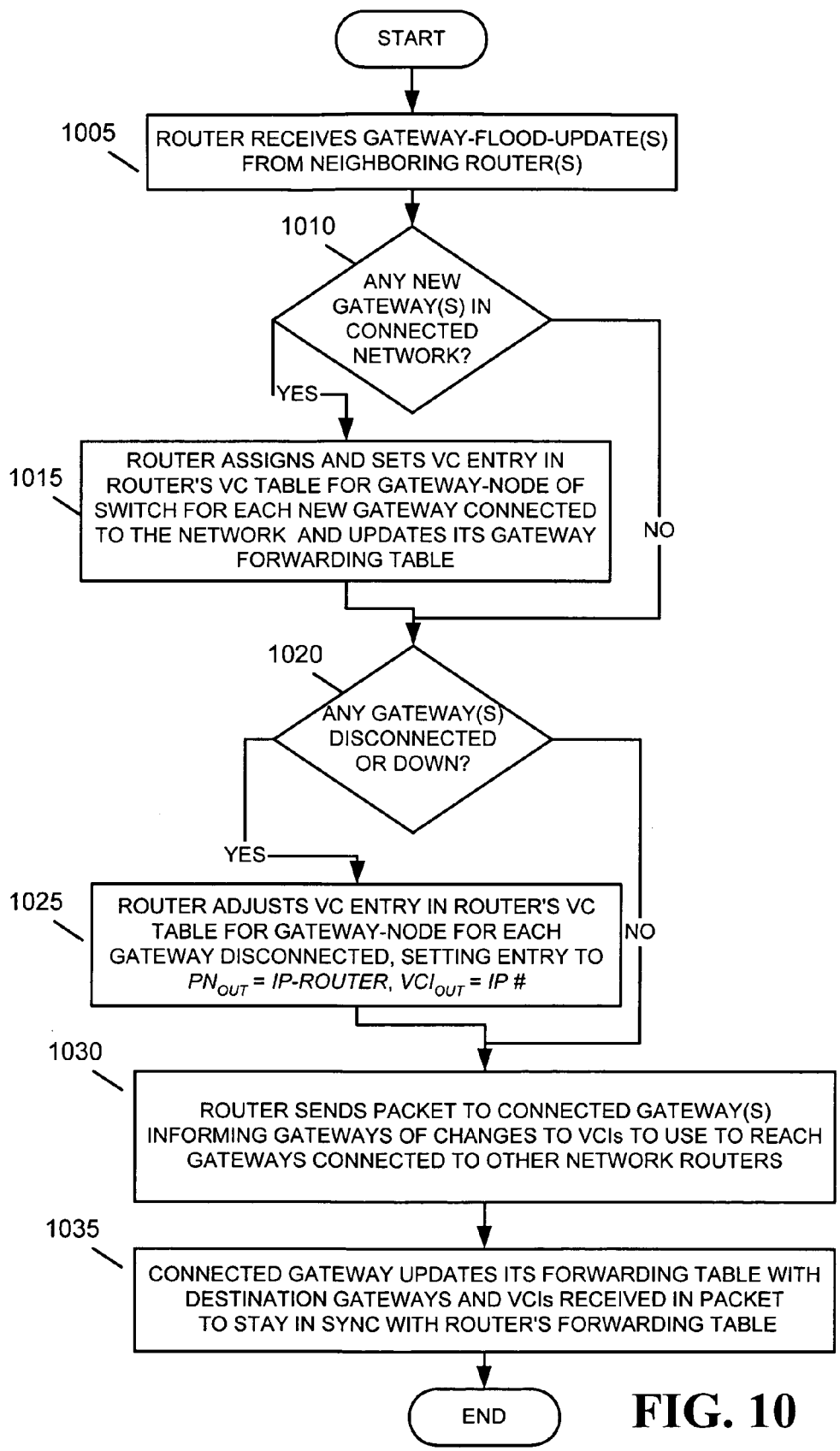
FIG. 10 is a flowchart that illustrates exemplary router gateway-flood-update processing consistent with the present invention.

FIG. 10 is a flowchart that illustrates exemplary processing, consistent with the present invention, for updating the entries in VC table 400. As one skilled in the art will appreciate, the method exemplified by FIG. 10 can be implemented as a sequence of instructions and stored in switch memory 215 of router/switches in network 100, such as router/switch 105.

To begin processing, router 105 receives update packets 700 and/or 800 from neighboring routers (e.g., R2 110, R3 115) [step 1005]. From the received packets, router 105 determines if there are any new gateways in network 100 [step 1010]. If so, router 105 assigns and sets VC entry 405 in switch's gateway-node VC table 400 for each new gateway connected to network 100 [step 1015] and updates its gateway forwarding table 600. If there are no new gateways in network 100, router 105 determines if any previously existing gateways have been disconnected or are down [step 1020]. If not, processing proceeds to step 1030. If any previously existing gateways are down, or if their routers have been disconnected, router 105 adjusts the VC entry 405 in VC table 400 for each gateway down or disconnected, setting the router output port entry 410 to "IP-router" and setting the $VCI_{out}$ 415 to IP # so that packets arriving from the gateway with this VCI are sent to the IP Router by its switch for processing [step 1025]. Router 105 may then send a packet 900 to any connected gateway informing the connected gateway of changes to VCIs that the connected gateways may use to reach other gateways connected to other routers in network 100 [step 1030]. Each connected gateway, such as gateway 135, updates <Destination Gateway, $VCI_{out}$>entries 610 in its gateway forwarding table 600 with the Gateway 910 and gateway VCI 915 values received in packet 900 [step 1035] in order to keep its gateway forwarding table 600 in sync with that of its router.

EXEMPLARY GATEWAY PACKET FORWARDING PROCESSING

Figure 11:
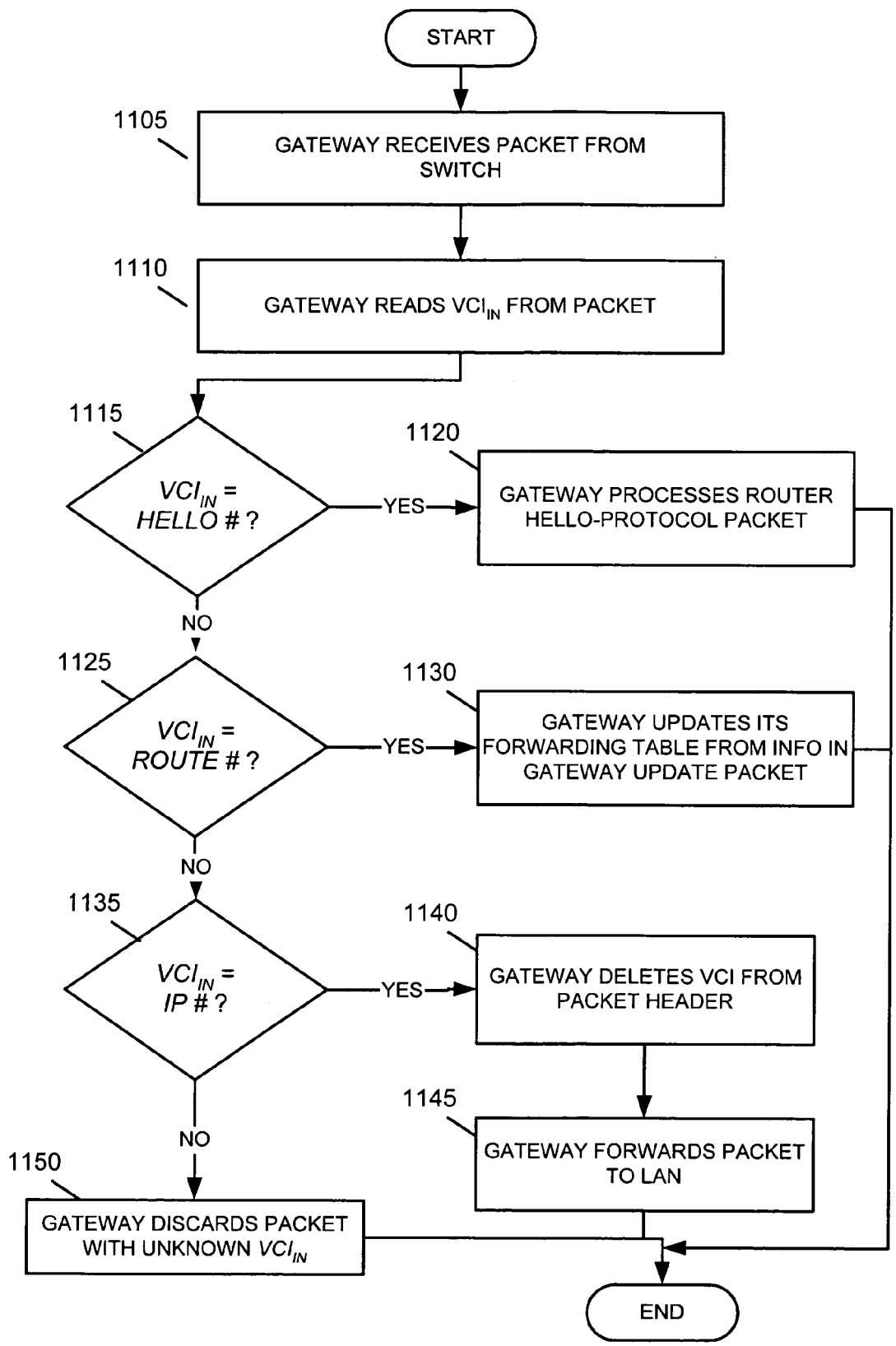
FIG. 11 is a flowchart that illustrates exemplary gateway processing of packets from LAN consistent with the present invention.

FIG. 11 is a flowchart that illustrates exemplary processing, consistent with the present invention, for forwarding packets received at a gateway in network 100, such as gateway 135, from a connected router/switch, such as router/switch 105. As one skilled in the art will appreciate, the method exemplified by FIG. 11 can be implemented as a sequence of instructions and stored in memory 310 of gateways 135.

To begin processing, gateway 135 may receive a packet from router/switch 105 [step 1105]. Gateway 135 may then read the incoming VCI ($VCI_{IN}$) from the packet header [step 1110]. Gateway 135 may determine if $VCI_{IN}$ is equal to the 'Hello' protocol entry number [step 1115]. If so, gateway 135 processes the received packet in the conventional fashion for 'hello' or 'keep-alive' protocols (which are used to determine the up/down state of an attached device)[step 1120]. If not, gateway 135 may determine if $VCI_{IN}$ is equal to the 'route number' [step 1125]. If so, gateway 135 processes the received router-to-gateway-update packet 900 and updates its gateway forwarding table 600 from data in packet 900 [step 1130]. If not, gateway 135 may determine if $VCI_{IN}$ is equal to the IP number [step 1135]. If so, gateway 135 removes the switch-packet header containing the $VCI_{IN}$ from the packet [step 1140] and forwards the packet to LAN 145 [step 1145]. If $VCI_{IN}$ is not equal to any of these numbers (typically 1, 2, and 3 respectively), then gateway 135 may discard the packet as being of an unknown type [step 1150].

Figure 12:
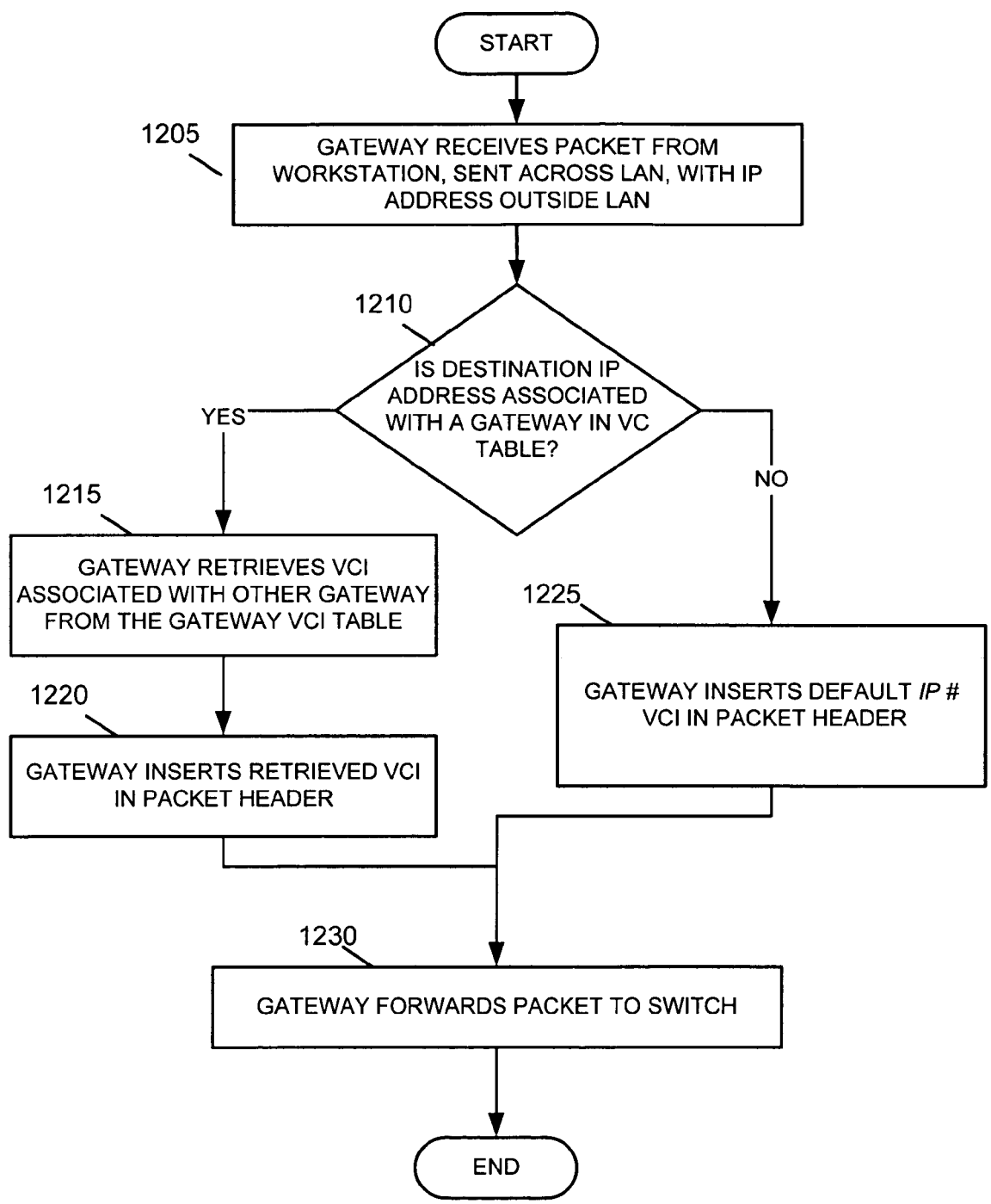
FIG. 12 is a flowchart that illustrates exemplary gateway processing of packets from switch consistent with the present invention.

FIG. 12 is a flowchart that illustrates exemplary processing, consistent with the present invention, for forwarding packets received at a gateway in network 100, such as gateway 135, from a workstation connected to a LAN, such as LAN 145. As one skilled in the art will appreciate, the method exemplified by FIG. 12 can be implemented as a sequence of instructions and stored in memory 310 of gateway 135.

To begin processing, gateway 135 may receive a packet sent from a workstation, such as workstation 160a, across LAN 145, the packet containing a destination IP address that resides outside of LAN 145 [step 1205]. Gateway 135 may determine if the destination IP address is associated with a gateway in its gateway forwarding table 600 [step 1210]. If not, gateway 135 can insert the customary default IP # VCI [typically the number "1"] in the packet header [step 1225] so that the switch, on receiving the packet, will forward it to its router for customary processing. If gateway 135 determines that the destination IP address is associated with a gateway in its gateway forwarding table 600, gateway 135 can retrieve a $VCI_{out}$ 610, associated with the gateway, from the gateway VCI table 600 [step 1215]. Gateway 135 may then insert $VCI_{out}$ 610 in the packet header [step 1220].

At step 1230, gateway 135 can forward the received packet to switch 105.

EXEMPLARY ROUTER FORWARDING PROCESSING

Figure 13:
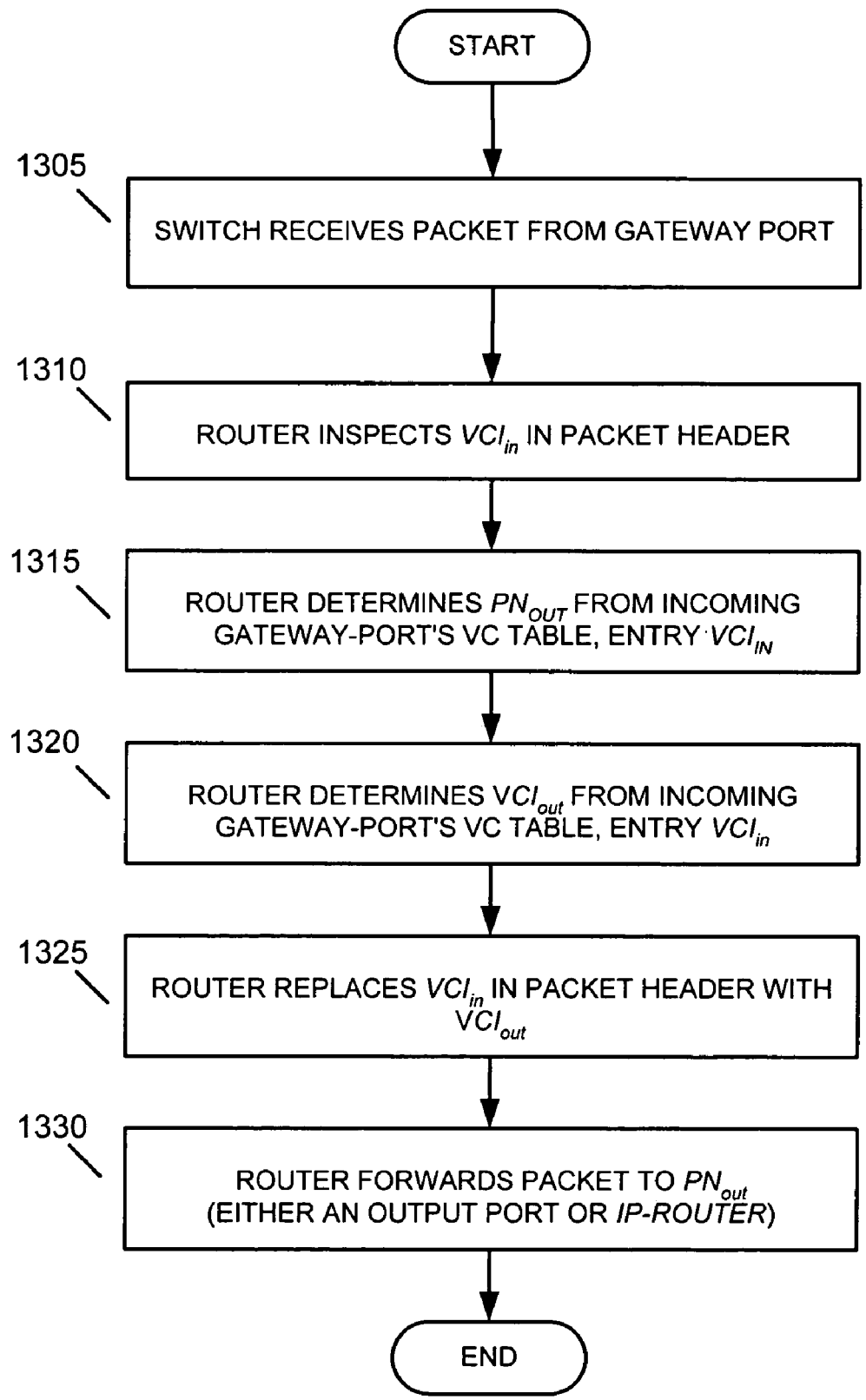
FIG. 13 is a flowchart that illustrates exemplary switch processing of packets from gateway consistent with the present invention.

FIG. 13 is a flowchart that illustrates exemplary processing, consistent with the present invention, for forwarding packets received at a switch in network 100, such as switch 105, from a gateway, such as gateway 135, connected to its a switch-gateway interface 250. As one skilled in the art will appreciate, the method exemplified by FIG. 13 can be implemented as a sequence of instructions and stored in switch memory 215 of router R1 105.

To begin processing, router/switch R1 105 may receive a packet from switch-gateway interface 250 [step 1305] and then may inspect the packet's incoming VCI ($VCI_{in}$) in the packet header [step 1310]. Router R1 105 may further determine an output port number ($PN_{out}$) 410 from VC entry 405, corresponding to $VCI_{in}$, of switch-gateway interface 250 VC table 400 [step 1315]. Router R1 105 may then determine an outgoing VCI ($VCI_{out}$) 415 from VC entry 405, corresponding to $VCI_{in}$, of VC table 400 [step 1320]. Router R1 105 can replace $VCI_{in}$ in the packet header with the determined $VCI_{out}$ 415 [step 1325]. Router R1 105 may then forward the packet to $PN_{out}$ 410 (either an output port or IP-router 205 [step 1330].

CONCLUSION

Systems and methods consistent with the present invention provide mechanisms that assign virtual circuit identifiers to LAN gateways and distribute the VCIs to other LAN gateways throughout a network. Distribution of these VCIs permits each receiving LAN gateway to implement virtual circuit paths with other LAN gateways in the network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Also, while series of steps have been described with regard to FIGS. 10–13, the order of the steps may be altered in other implementations consistent with the present invention. No element, step, or instruction used in the description of the present application should be construed as critical or essential to the invention unless explicitly described as such. The scope of the invention is defined by the following claims and their equivalents.

What is claimed is:

1. A method of distributing virtual circuit identifiers associated with gateways in a network, comprising:

receiving, at a first router/switch, packets comprising a plurality of first virtual circuit identifiers associated with gateways in the network;
determining if any of the gateways are connected to the first router/switch;
assigning, at the first router/switch, second virtual circuit identifiers to connected gateways; and
initiating the transmission of a message from the first router/switch to the connected gateways informing the connected gateways of the plurality of first virtual circuit identifiers.

2. The method of claim 1, further comprising:
initiating transmission of a packet to neighboring routers/switches informing the routers/switches of the assigned second virtual circuit identifiers and the plurality of first virtual circuit identifiers.

3. The method of claim 1, further comprising:
updating at least one virtual circuit table stored at the first router/switch using the first virtual circuit identifiers.

4. A network device, comprising:
at least one network interface configured to:
receive packets flooded from other network devices in a network comprising a plurality of first virtual circuit identifiers associated with gateways in the network; and
at least one processor configured to:
determine if any gateways are connected to the network device,
assign second virtual circuit identifiers to connected gateways, and
initiate the transmission of a message to the connected gateways informing the connected gateways of the plurality of first virtual circuit identifiers.

5. The network device of claim 4, wherein the at least one processor is further configured to:
initiate transmission of a packet to neighboring nodes informing the nodes of the assigned second virtual circuit identifiers and the plurality of first virtual circuit identifiers.

6. The network device of claim 4, further comprising:
a memory configured to store at least one virtual circuit table; and
where the processor is further configured to:
update the at least one virtual circuit table using the first virtual circuit identifiers.

7. A computer-readable medium containing instructions for controlling at least one processor to perform a method of distributing virtual circuit identifiers associated with gateways in a network, the method comprising:
receiving, at a first router/switch, packets comprising a plurality of first virtual circuit identifiers associated with gateways in the network;
determining if any of the gateways are connected to the first router/switch;
assigning, at the first router/switch, second virtual circuit identifiers to connected gateways; and
initiating the transmission of a message from the router/switch to the connected gateways informing the connected gateways of the plurality of first virtual circuit identifiers.

8. The computer-readable medium of claim 7, the method further comprising:
initiating transmission of a packet to neighboring routers/switches informing the routers/switches of the assigned second virtual circuit identifiers and the plurality of first virtual circuit identifiers.

9. The computer-readable medium of claim 7, the method further comprising:
updating at least one virtual circuit table stored in the first router/switch using the first virtual circuit identifiers.

10. A network comprising:
a plurality of gateways; and
a router connected to at least one of the plurality of gateways and configured to:
receive packets, flooded from other routers in the network, comprising a plurality of first virtual circuit identifiers associated with the plurality of gateways in the network, assign second virtual circuit identifiers to the at least one of the plurality of gateways, and
initiate the transmission of a message to the at least one of the plurality of
gateways informing the at least one gateway of the plurality of first virtual circuit identifiers.

11. The network of claim 10, wherein the router is further configured to:
initiate transmission of a packet to neighboring nodes in the network informing the nodes of the assigned second virtual circuit identifiers and the plurality of first virtual circuit identifiers.

12. The network of claim 10, wherein the router is further configured to:
update at least one virtual circuit table stored in the router using the first virtual circuit identifiers.

13. A method of forwarding packets received at a first gateway in a network, comprising:
receiving a message at the first gateway, the message comprising a plurality of virtual circuit identifiers associated with other gateways in the network;
receiving packets for transmission from the first gateway to a destination address associated with a second gateway; and
sending the received packets towards the second gateway using one of the received plurality of virtual circuit identifiers.

14. The method of claim 13, further comprising:
updating at least one virtual circuit table stored at the first gateway using the plurality of virtual circuit identifiers.

15. A computer-readable medium containing instructions for controlling at least one processor to perform a method of forwarding packets received at a first gateway in a network, the method comprising:
receiving a message at the first gateway, the message comprising a plurality of virtual circuit identifiers associated with other gateways in the network;
receiving packets for transmission from the first gateway to a destination address associated with a second gateway; and
sending the received packets towards the second gateway using one of the received plurality of virtual circuit identifiers.

16. The computer-readable medium of claim 15, the method further comprising:
updating at least one virtual circuit table stored at the first gateway using the plurality of virtual circuit identifiers.

17. A gateway comprising:
an interface configured to:
receive a message comprising a plurality of virtual circuit identifiers associated with other gateways in a network, receive a packet intended for transmission from the gateway to a destination address associated with a second gateway in the network; and
at least one processor configured to:

initiate transmission of the received packet towards the second gateway using one of the plurality of received virtual circuit identifiers.

18. The gateway of claim 17, wherein the at least one processor is further configured to:

update at least one virtual circuit table stored at the gateway using the plurality of virtual circuit identifiers.

19. A system for forwarding packets received at a first gateway in a network, the system comprising:

means for receiving a message at the first gateway, the message comprising a plurality of virtual circuit identifiers associated with other gateways in the network;

means for receiving packets for transmission from the first gateway to a destination address associated with a second gateway; and means for sending the received packets towards the second gateway using one of the received plurality of virtual circuit identifiers.

20. The method of claim 1, wherein the packets comprising a plurality of first virtual circuit identifiers associated with gateways in the network are flooded from other routers/switches in the network.

* * * * *